(12) United States Patent
Raciborski

(10) Patent No.: US 8,209,401 B2
(45) Date of Patent: Jun. 26, 2012

(54) RICH CONTENT DOWNLOAD

(75) Inventor: Nathan F. Raciborski, Phoenix, AZ (US)

(73) Assignee: Limelight Networks, Inc., Tempe, AZ (US)

(*) Notice: Subject to any disclaimer, the term of this patent is extended or adjusted under 35 U.S.C. 154(b) by 1281 days.

(21) Appl. No.: 10/958,978

(22) Filed: Oct. 4, 2004

(65) Prior Publication Data
US 2006/0031785 A1    Feb. 9, 2006

Related U.S. Application Data

(60) Provisional application No. 60/508,626, filed on Oct. 3, 2003.

(51) Int. Cl.
*G06F 15/16* (2006.01)
(52) U.S. Cl. .......... 709/219; 709/203
(58) Field of Classification Search .......... 709/219
See application file for complete search history.

(56) References Cited

U.S. PATENT DOCUMENTS

| | | | |
|---|---|---|---|
| 5,805,815 A * | 9/1998 | Hill | 709/218 |
| 5,963,916 A * | 10/1999 | Kaplan | 705/7.29 |
| 6,223,224 B1 | 4/2001 | Bodin | |
| 6,237,006 B1 | 5/2001 | Weinberg et al. | |
| 6,427,140 B1 | 7/2002 | Ginter et al. | |
| 6,460,163 B1 | 10/2002 | Bowman et al. | |
| 6,463,469 B1 * | 10/2002 | Yavitz | 709/219 |
| 6,595,856 B1 | 7/2003 | Ginsburg et al. | |
| 6,675,212 B1 * | 1/2004 | Greenwood | 709/224 |
| 6,922,782 B1 | 7/2005 | Spyker et al. | |
| 7,020,704 B1 * | 3/2006 | Lipscomb et al. | 709/226 |
| 7,209,900 B2 * | 4/2007 | Hunter et al. | 705/58 |
| 7,363,498 B2 | 4/2008 | Hennessey et al. | |
| 7,536,725 B2 | 5/2009 | Raciborski | |
| 7,779,035 B2 | 8/2010 | Raciborski et al. | |
| 7,891,014 B2 | 2/2011 | Raciborski | |
| 8,122,100 B2 | 2/2012 | Raciborski et al. | |
| 2001/0030660 A1 * | 10/2001 | Zainoulline | 345/720 |
| 2002/0049909 A1 | 4/2002 | Jackson et al. | |
| 2002/0091848 A1 * | 7/2002 | Agresta et al. | 709/231 |
| 2002/0099798 A1 * | 7/2002 | Fedorovsky et al. | 709/219 |
| 2002/0138554 A1 | 9/2002 | Feigen et al. | |

(Continued)

FOREIGN PATENT DOCUMENTS

EP    1 154 611 A2    11/2001

(Continued)

OTHER PUBLICATIONS

"Server". downloaded from http://whatis.techtarget.com/definition/0,,sid9_gci212964,00.html. Feb. 26, 2008.*

*Primary Examiner* — Scott Christensen
(74) *Attorney, Agent, or Firm* — Kilpatrick Townsend Stockton LLP

(57) ABSTRACT

According to the invention, a content download system for downloading a content file and additional content using a window is disclosed. The content download system includes a content site, a content provider and a third party. The content site presents the window that displays the download progress of the content file, presents the additional content while the content file is downloaded, and allows selection of the additional content. The content provider serves as an origin server for the content file. The third party receives information on the content file and provides the additional content.

26 Claims, 11 Drawing Sheets

U.S. PATENT DOCUMENTS

| | | |
|---|---|---|
| 2002/0138593 A1 | 9/2002 | Novak et al. |
| 2003/0005301 A1 | 1/2003 | Jutzi et al. |
| 2003/0014630 A1* | 1/2003 | Spencer et al. ............... 713/168 |
| 2003/0078918 A1 | 4/2003 | Souvignier et al. |
| 2003/0195974 A1* | 10/2003 | Ronning et al. .............. 709/230 |
| 2004/0019497 A1* | 1/2004 | Volk et al. ......................... 705/1 |
| 2004/0064573 A1 | 4/2004 | Leaning et al. |
| 2004/0199809 A1 | 10/2004 | Hanam et al. |
| 2004/0254958 A1* | 12/2004 | Volk ........................... 707/104.1 |
| 2005/0125660 A1 | 6/2005 | Raciborski |
| 2005/0131983 A1* | 6/2005 | Raciborski et al. ........... 709/200 |
| 2005/0132083 A1* | 6/2005 | Raciborski et al. ........... 709/232 |

FOREIGN PATENT DOCUMENTS

| | | | |
|---|---|---|---|
| EP | 1309153 A1 | * | 5/2003 |
| WO | 9700480 A1 | | 1/1997 |

* cited by examiner

RICH CONTENT DOWNLOAD

This application claims the benefit of and is a non-provisional of U.S. Application Serial No. 60/508,626 filed on Oct. 3, 2004, which is incorporated by reference in its entirety for all purposes.

BACKGROUND OF THE DISCLOSURE

This disclosure relates in general to content delivery and, more specifically, but not by way of limitation, to downloading of content.

Today, content files are downloaded from services for playback from a computer hard drive or media player. In some cases, certain song files can be used to produce compact disks (CDs) for playback in any CD player. With some download services, digital rights management (DRM) is used to protect the file after download such that usage is restricted in predefined ways. During the download, the customer simply waits for the process to complete before accessing the content. Some players allow streaming playback of content instead of using the download before playing model.

Theft of copyrighted content on the Internet is rampant. Some have postulated that theft of content can only be remedied by legal alternatives. The legal content download sites allow receiving audio and video files. These files may or may not be protected by DRM. Users download the content files, which can take minutes or hours to complete. During the download process, the computer processor and Internet connection is taxed by this process. Often users begin a download and abandon their computer until the process completes. Some download processes display a status bar showing progress, a "please wait" message or an animated graphic.

BRIEF DESCRIPTION OF THE DRAWINGS

The present disclosure is described in conjunction with the appended figures.

Figure 1A:
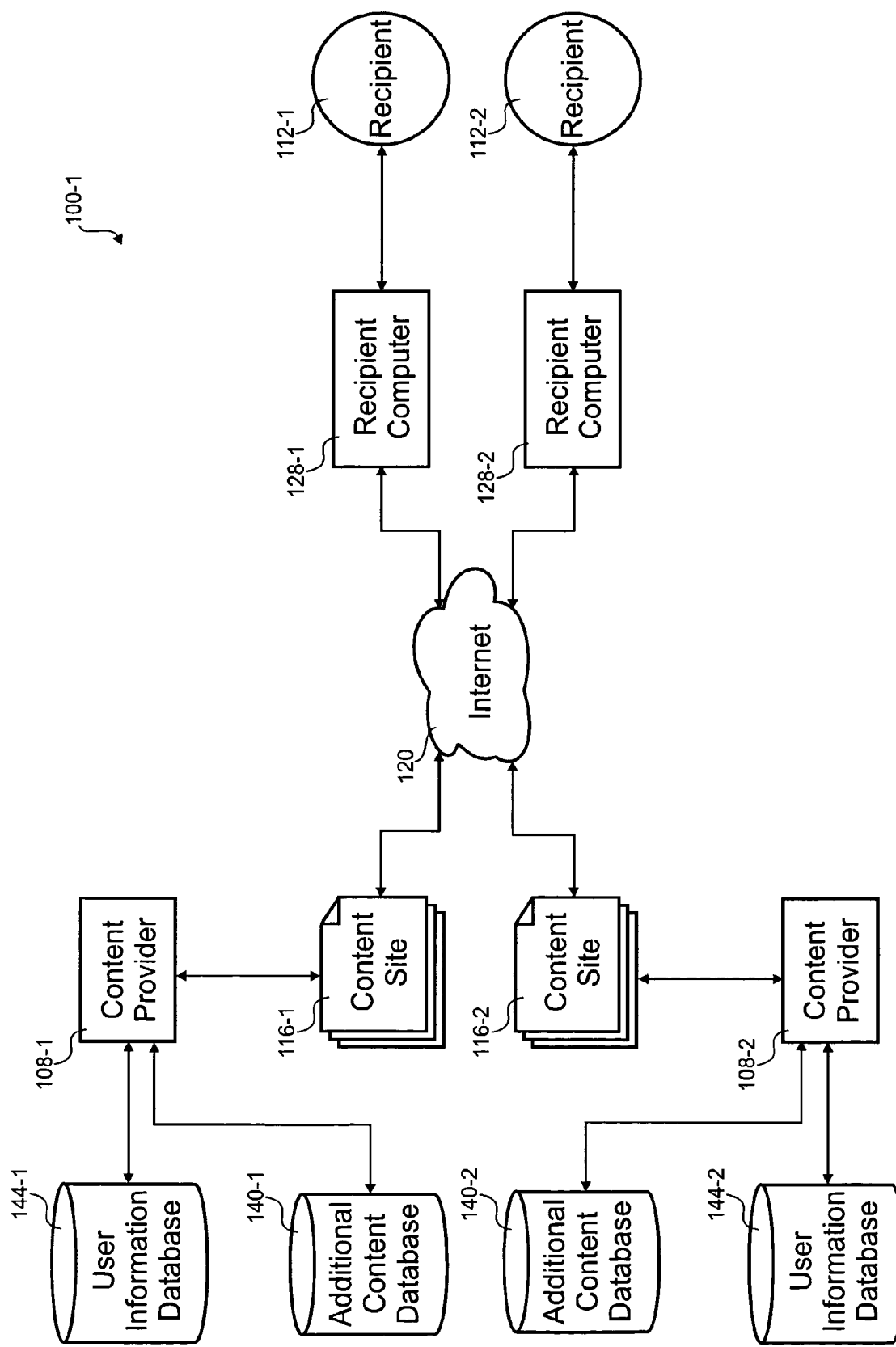
FIGS. 1A, 1B and 1C are block diagrams of embodiments of a content download system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order o the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer-readable medium" includes, but is not limited to, portable or fixed storage devices, optical storage devices and various other mediums capable of storing or containing instructions and/or data.

In another embodiment, the present disclosure provides a method for downloading a content file and receiving additional content with a window. In one step, selection information is received that indicates the content file chosen by the recipient. The content file is downloaded with the window where status is displayed with that window. It is determined which additional content to present, where the additional content is associated with the content file and/or customer in some way. Access to the additional content is allowed from the window while the content file is downloading.

In yet another embodiment, the present disclosure provides a method for downloading a content file and receiving additional content with a window. In one step, selection information is received that indicates the content file. The content file is downloaded with the window, where download status information is provided with the window. The additional content to present is determined. The additional content is associated with the content file and/or customer in some way. In this embodiment, the additional content is video or audio. Access is allowed to the additional content while the content file is downloading.

The present invention enhances delivery of a content file, such as, a video, music/audio file, a picture, an e-book, a game, software, a manuscript or any other copyrightable material. In one embodiment, the download manager provides additional content during and/or after the content is downloaded. For example, the customer may download a song from a particular artist, before a ten second video vignette is played for the customer thanking the customer for legally acquiring rights to the song. The vignette could include a message from the artist, a music video, a cross-promotion, or some other additional content related to the download. In various embodiments, the additional content could include hypertext links to more information about the content file, lyrics or other written material, a karaoke version of the content file, applications or games related to the content file, audio and/or video messages, pictures related to the content file, an e-book, animated videos, FLASH™ demonstration, album art, liner notes, song lyrics, different encodings of the content file, CD label artwork, desktop wallpaper or computer themes, related content files (e.g., "making-of" videos, artist interviews, and out-takes), etc.

The additional content is tailored to the context of the situation. The genre of the content file, artist of the content file, label or studio promoting the content file, download service used for download, customer identity (e.g., name, age, address, phone number, etc.), prior purchases of the customer, recent events, fan club memberships, etc. can all be used in determining the additional content for a given situation. For example, the download manager and download service could determine that a particular video vignette had been played previously and arrange for a new one to be played. In another example, a customer with a significant interest in an artist, genre, studio, or label (as evidenced on their content collection or buying habits) could be invited to join a club of like-minded customers, join an online community and/or receive a fanzine or magazine subscription. In yet another example, when a particular song or video is downloaded, the artwork on the tangible version could be displayed. This could also include the liner notes, lyrics, credits, CD artwork, bonus material, etc. typically found in distribution media for audio and video.

In another example, the system could recognize that my area code is 602 and I purchased song(s) from a specific artist. It could then play a video vignette with that artist saying, 'Thanks for buy my latest song. I'll be in Phoenix on October 12 for a concert, please call 888.555.1111 for ticket information'. This illustrates an unique aspect of the invention in that tailored and relevant additional content is made available to these online download services to be provided to receptive customers as promotion. Unlike a conventional record store experience, where a person simply checks out at the register and never hears about concerts in the area, the experience of this invention can enhance the fan's affinity to an artist in one embodiment.

The experience of rich content download could be consistent regardless of the number of download services used to collect the content. The download manager could be used with any number of download services. The download manager could determine or track the content files on the users computer(s) or could query a database(es) that indicated the content files licensed to the customer. The licenses of the customer could be kept in a central database and/or databases maintained by the download services, licensing agencies, artists, studios, labels, and/or other organizations.

In some embodiments, the additional content could include additional content files or expanded rights to existing content files. For example, if the download manager and/or download service determines that eight of ten songs from an album had been purchased, the download manager and/or download service could offer the remaining two songs at a discount or for free. The rights to the content file controlled by the DRM could be expanded if certain conditions are met, such as rights to write a movie to a disk if five movies are purchased from a particular studio.

In some embodiments, this information could be embedded in the content file or sent separately. The additional content could be activated while during the content file download or after the download is complete. Configuration screens of the download service and/or the download manager allow disabling some or all of these features.

One embodiment allows a low-bandwidth version of the additional content that only provides links, text and/or pictures. By selecting a link, the customer can optionally download the additional content. The low-bandwidth version could be selectively enabled by the customer by configuring the download manager and/or content service. Other embodiments could have low-bandwidth additional content during the download and switch to higher-bandwidth additional content afterward.

With customized additional content, a wide variety of possible additional content could be collected. A distribution strategy would be designed into an algorithm for promoting the content file in a desired manner. For example, an artist might record tens of video or audio vignettes that would be played in various situations, such as a vignette promoting a new song that is played the week of the new song's release. New vignettes could be added over time to address current issues and/or new promotion strategies. The download service could provide interfaces to the artists and their representatives to allow customizing of the distribution strategies. In one example, the download manager displays a listing of other content files that are determined to be of interest to the customer. Some embodiments may store the interests of the customer in the download manager and/or could store the interests in a database remote to the customer's download manager.

In this embodiment, application software or applets are used to implement the download manager. This functionality could be embedded into the web browser and/or media player in other embodiments. The download manager displays a window or activates a window in another program to present the additional content. For example, the download manager could activate a video player application that plays a streamed video vignette chosen by the download service after download of the content file. The customer may automatically be presented with the additional content or be required to request it with a link or button.

In one embodiment the download manager includes an embedded browser next to the audio or video presentation portion. This adjacent browser could offer free downloads of other content files and links. Activation of a link for another content file in the adjacent browser window could launch another and separate download manager for those other content files. Alternatively, a single download manager could also download the other content files.

In some embodiments, the additional content is available before purchase or download of the content file. Other embodiments may only describe the additional content, but not make it available until after purchase or download. Yet other embodiments may be a hybrid between these approaches that makes some additional content available before download or purchase, while other additional content is made available afterward. For example, the information describing the content file may include a picture of the cover of the album, but the liner notes are not available until after download or purchase. The download manager and/or download services could remember the entitlement to the additional content so it would be accessible at a later time.

In another embodiment, a video or audio vignette is played, which could be a promotion or commercial. To assure the customer is present, a test question or button might have to be executed after completion of the vignette. Once the presence of the customer is confirmed, additional content is provided as a bonus. This interaction could follow an algorithm, storyline or theme in nested loops and branches in various directions much like an interactive game. In this way, interaction with the vignettes qualifies a customer for additional content, which may or may not be a content file.

The principals of this invention could be extended to customization of the download manager according to some theme. For example, skins, buttons, title bars, etc. could be customized for the download manager, artist, label, studio, genre, etc. This customization could be tied into the download service. As an example, the download service could have a religious music section. When the download manager is activated, the look and feel is customized for that genre. The download manager could call predefined configurations or could send a custom configuration. These configurations could be tied to advertising contracts. For example, when a particular artist has their content file downloaded, their sponsoring cola has their configuration customize the download manager.

Referring initially to FIG. 1A, a block diagram of an embodiment of a content download system 100-1 is shown. This embodiment shows two content providers 108 and two recipients 112 to keep the diagram simple, but there could be any number of content providers 108 and recipients 112. Each recipient 112 has a recipient computer 128 that is used to download and store content objects received from the content provider 108 over the Internet 120. These content objects could be files or streams, for example, a video, music/audio file, a picture, an e-book, a game, software, a manuscript or any other copyrightable material. DRM may be used on the recipient computer to manage the rights of the licensee/recipient 112.

One or more content providers 108 are available to the recipient 112 for downloading content objects. The content provider 108 aggregates content objects from a number of copyright holders and makes them available for order from a content web site 116. Examples of content providers 108 include video download services, music download sites, audio download sites, software download sites, eBook sales sites, software download sites, etc. The content provider 108 could be a single server or multiple servers that supply the content objects, for example, there could be caches or mirrors to assist in the distribution load.

The content provider 108 stores various information. Primarily, the content provider 108 stores or has access to the content objects made available on the content site 116. Some embodiments retrieve the content objects directly from the copyright holders or their agents after the content object is ordered such that local storage is not necessary.

The content provider 108 also stores information on the recipients 112 that use the content site 116. A user information database 144 stores demographic information, payment information, ordering history, and any preferences of the recipient 112. The user information database 114 is used along with information from the current order when determining the additional content to offer the recipient 112 during download. Some embodiments of the content provider 108 may have access to a license or content database on the recipient computer 128 or stored elsewhere that allows the content provider 108 to determine which content objects were ordered from other content providers or that the content provider 108 has no record of. By accessing a broader sampling of what types of content objects the recipient 112 is interested in, the additional content can be offered with a greater chance that it is relevant to the recipient. For example, the recipient 112 may be ordering a single song, but a check of the license database might find that nine of ten songs from an album had now been purchased from a variety of content providers. The additional content offered could be the last song from the album.

The content provider 108 has access to an additional content database 140. When a recipient 112 is downloading one or more content objects, additional content is offered to the recipient 112. The additional content that is offered is related to the recipient's preferences, location, past purchases, content licenses, the currently ordered content object(s), and/or other criteria. The additional content could include hypertext links to more information about the content file, lyrics or other written material, a karaoke version of the content file, applications or games related to the content file, audio and/or video messages, pictures related to the content file, an e-book, animated videos, FLASH™ demonstration, album art, liner notes, song lyrics, different encodings of the content file, CD label artwork, desktop wallpaper or computer themes, related content files (e.g., "making-of" videos, artist interviews, and out-takes), etc. A browser window or an application window displays the progress of the content object download and provides links to the additional content. In some embodiments, the additional content is automatically played in the download status window. The recipient 112 adjust preferences to specify if additional content should be offered and if additional content can automatically begin playing without requiring any interaction.

Figure 1B:
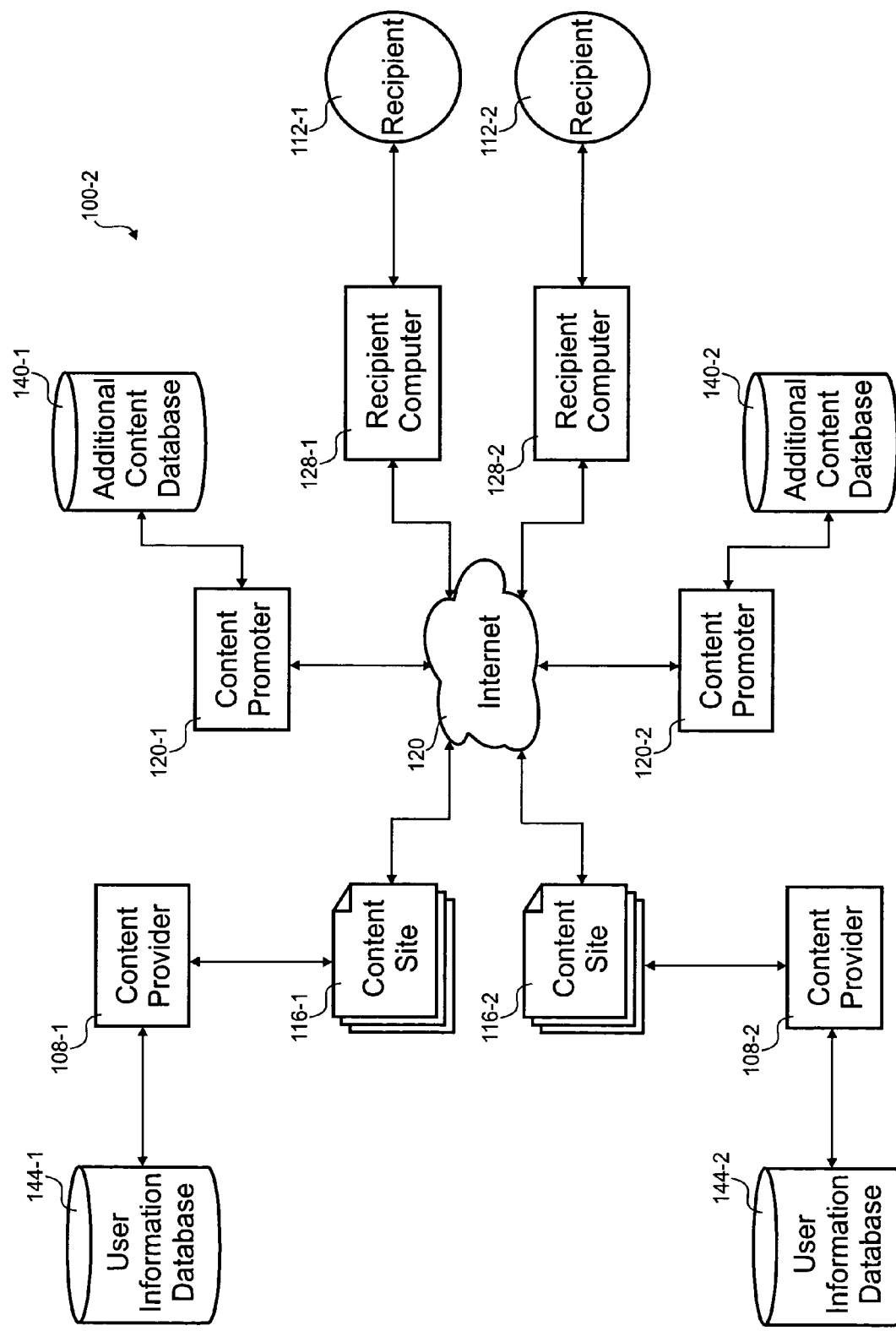

With reference to FIG. 1B, a block diagram of another embodiment of the content download system 100-2 is shown. In this embodiment, the additional content database 104 is managed by one or more content promoters 120. Two content promoters 120 are shown in the diagram to make things simple, but it is to be understood that any number of content promoters 120 could be present in various embodiments. The content promoter 120 is typically the copyright owner, an agent of the copyright owner, and/or an owner or licensee of the copyright owner.

When a content object(s) is selected for download, the identity of that content object is passed to the content promoter 120. The content provider 108 may also send information from the user information database. The content promoter 120 analyzes what is passed and chooses one or more pieces of additional content from the additional content database 140. That additional content can be passed to the content provider 108 for adding to the download status window or the content promoter 120 can present the additional content in a portion of the download status window by controlling a framed portion of that window.

Figure 1C:
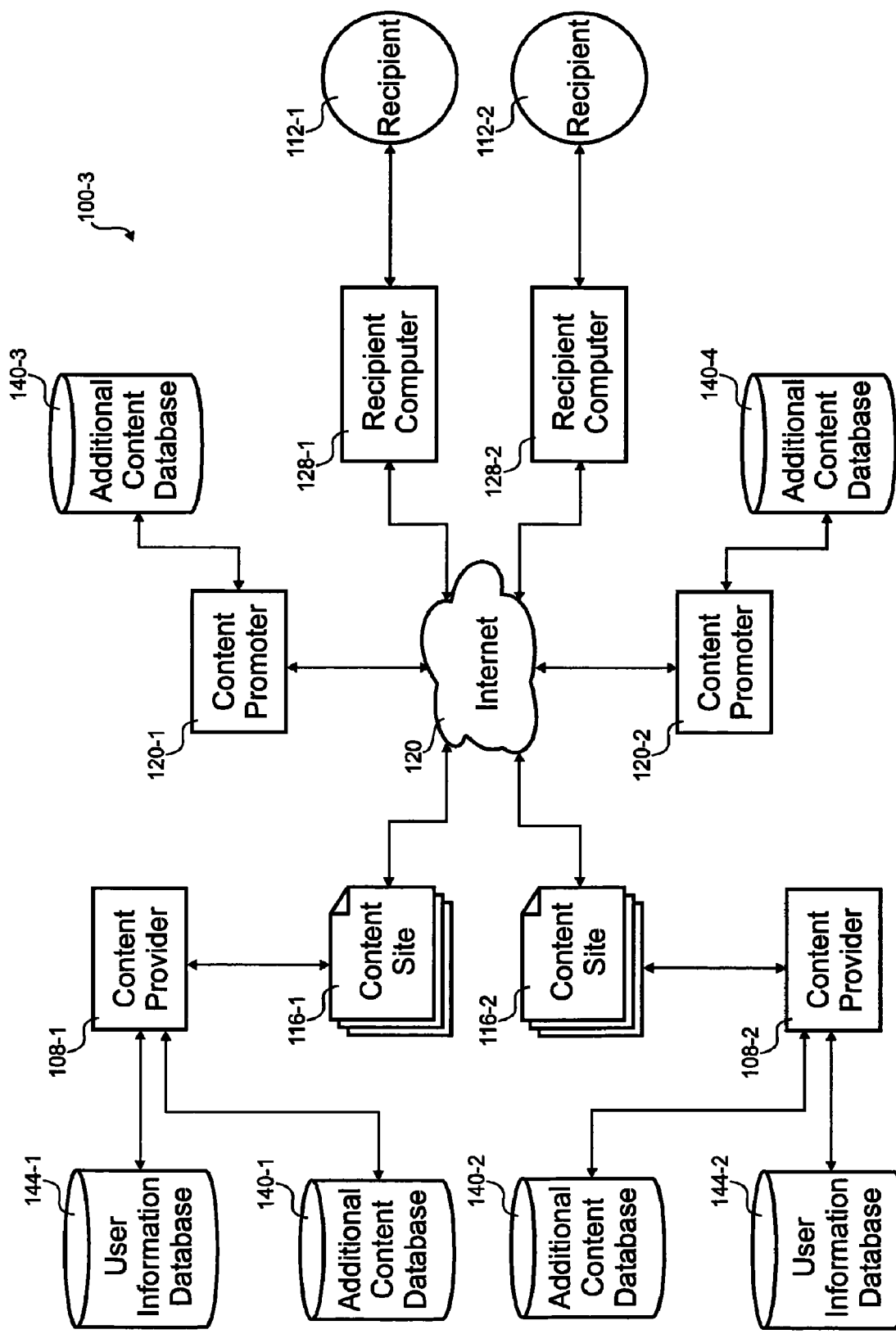

Referring next to FIG. 1C, a block diagram of yet another embodiment of the content download system 100-3 is shown. In this embodiment, both the content provider 108 and the content promoter 120 can provide additional content. For example, the content provider 108 may offer additional content related to the user information database 144 contents and the content promoter 120 may offer additional content related to the content object(s) ordered. Some embodiments may have the content provider 108 supply the additional content in some cases, but have the content promoter 120 supply it in other circumstances. For example, the content provider 108 could supply additional content when a content promoter 120 cannot be located or has no additional content to offer.

Figure 2A:
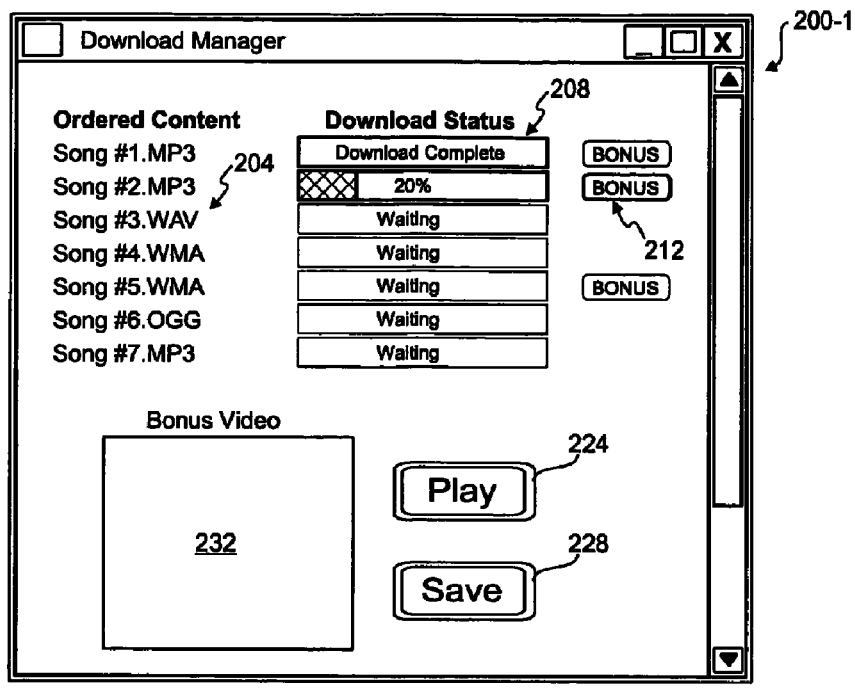
FIGS. 2A, 2B, 2C, 2D, 2E, 2F, 2G and 2H are screen shots of embodiments of a download status window.

Referring next to FIG. 2A, a screen shot of an embodiment of a download status window 200-1 is shown. The download status window could be produced by a web browser, application software or an operating system. In this embodiment, the download status window 200-1 is produced by a download manager program. When the recipient 112 selects all the content objects for download from the content site 116, a download manager program is customized to point to the content objects. The download manager program is received by the recipient computer 128 and executed. Once executed, the download status window 200-1 is presented. In another embodiment, the content site 116 presents a download status window 200-1. Yet another embodiment, integrates the functionality of the download status window into the browser or operating system such that a rich download experience is available for all or select downloads.

The download status window 200 shows the file name 204 of the ordered content objects. Download status 208 is provided for each of the ordered file names 204. The content provider 108 indicates with a bonus button 212 when additional content is available for a particular file name 204. In some cases, the additional content is associated with a number of files 204 or is a general bonus that is not specifically related to the listed file names 204. In the depicted embodiment, there are bonuses for three of the seven content objects selected for download. The second-listed bonus button is currently active and is associated with a bonus video 232. The recipient 112 can activate a play button 224 to begin the video 232 and/or can save 228 the bonus video 232. In some cases, the bonus video 232 cannot be saved and may be subject to DRM.

Figure 2B:
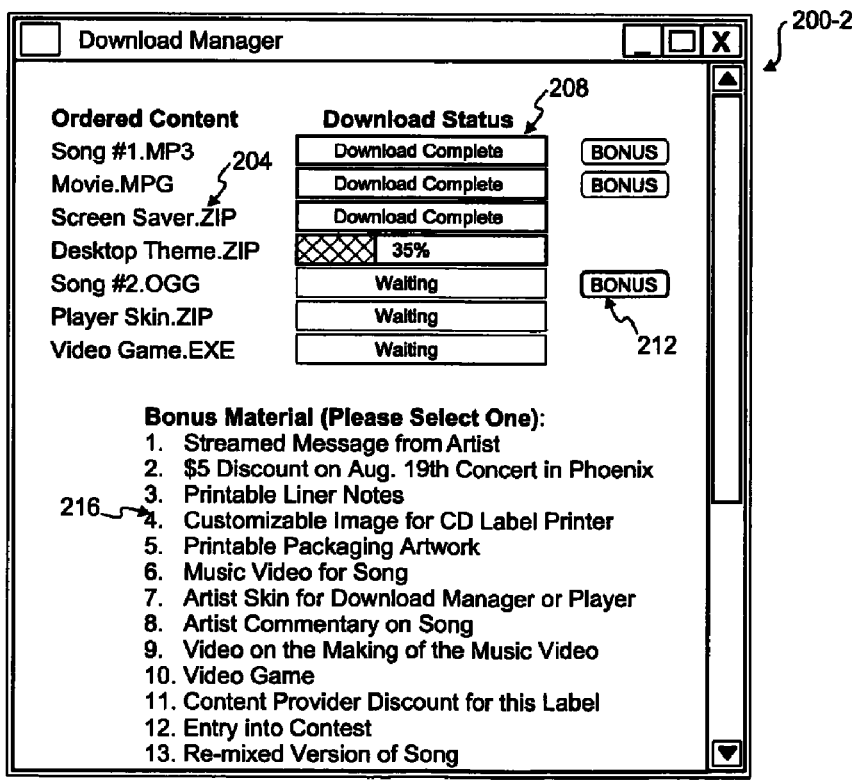

With reference to FIG. 2B, a screen shot of another embodiment of a download status window 200-2 is shown. In this embodiment, the selected bonus button 212 for the fifth content file activates a list of additional content that is available to the recipient 112. In this example, only one can be selected from a list 216 of bonus items. Each item in the list 216 links to the additional content offering or some additional information about the offering. The additional information could be displayed in the download status window 200 or in another window.

Some additional content would be downloaded and appear in the download status window 200 as another content file if selected. The first additional content option would provide a video or audio message from the artist for the fifth content file. The video or audio message could be customized according to the particular recipient. For example, the content promoter 120 may notice that the recipient 112 has downloaded a significant portion of a particular label's offerings. The artist's message may invite the recipient to join a club for that label, which would offer discounts and information about offerings.

Figure 2C:
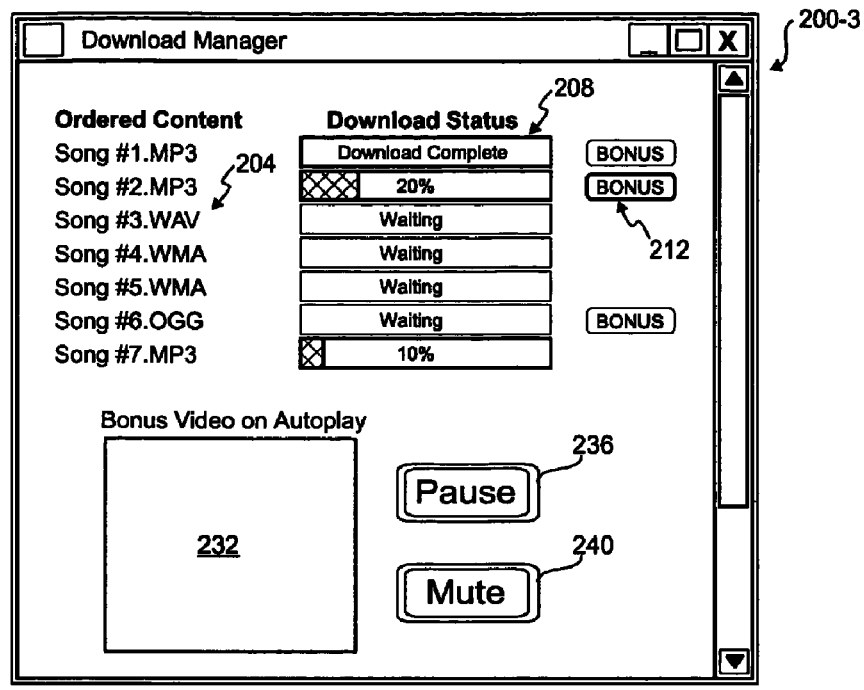

Referring next to FIG. 2C, a screen shot of yet another embodiment of a download status window 200-3 is shown. In this embodiment, the bonus video 232 begins playing automatically. The video begins during download of the associated content object. Some embodiments may play the bonus video at any point during the download of the content objects. Care is taken not to play the streamed content while associated content for another content object is presented. The recipient 112 can pause or mute the playback with soft buttons 236, 240.

Figure 2D:
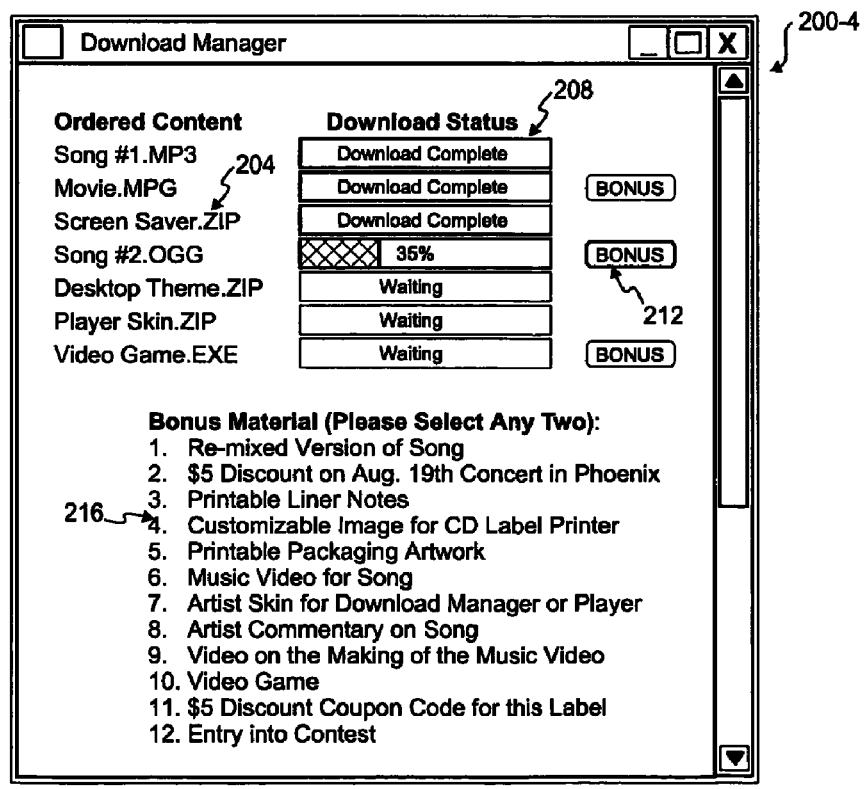

With reference to FIG. 2D, a screen shot of still another embodiment of a download status window 200-4 is shown. This embodiment allows selection of any two listed selections. The associated content for a particular content object gives a number of options from which two can be selected. Other embodiments could have any number of ways to select multiple bonus items. For example, there could be two lists and the recipient 112 could select a number from each list. In another example, the first selection of the recipient 112 affects a second list presented that has additional items.

Figure 2E:
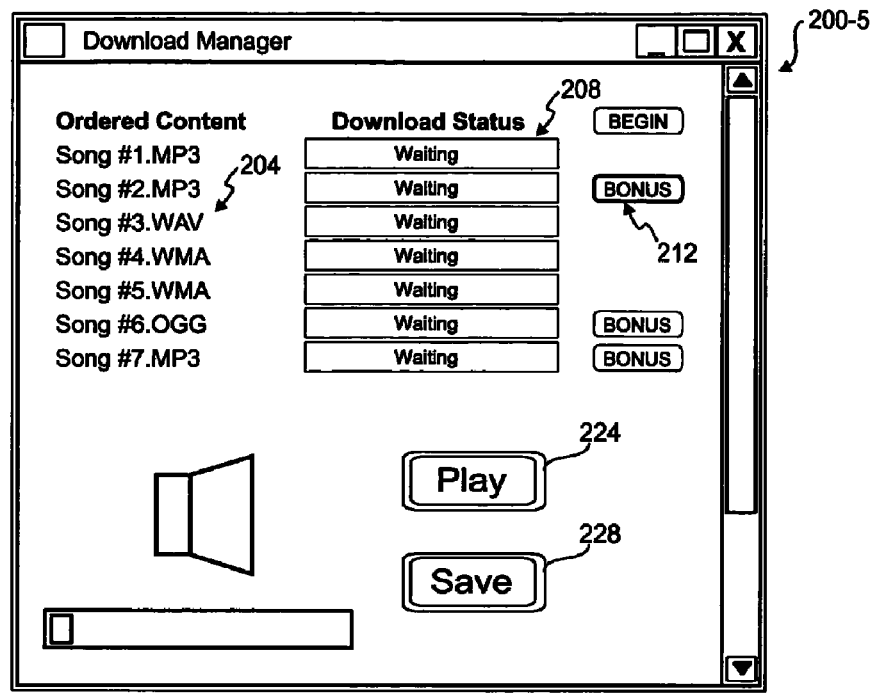

Referring next to FIG. 2E, a screen shot of one embodiment of a download status window 200-5 is shown. In this embodiment, a sound clip is presented as a bonus for the second content object. The recipient 112 can play and/or save the associated content. In this example, the associated content is available before download has begun for any of the content objects.

Figure 2F:
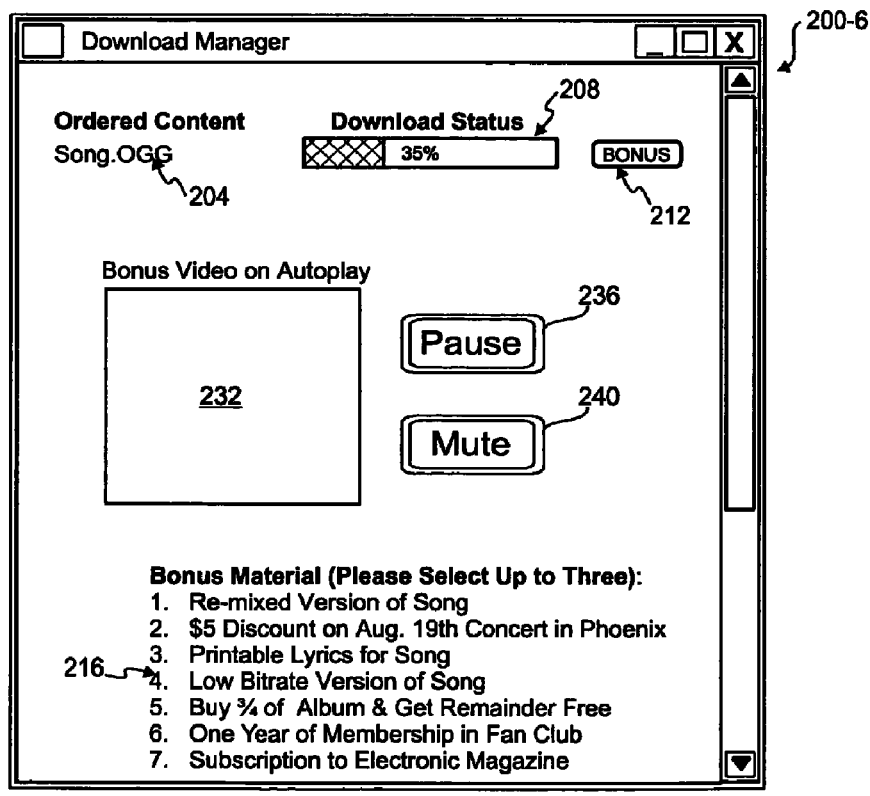

With reference to FIG. 2F, a screen shot of another embodiment of a download status window 200-6 is shown. In this embodiment, a single content object is selected for download. The content object has an automatically streamed video as associated content and also has a list of bonus items 216. Three of the bonus items 216 can be selected. Even though this embodiment shows a bonus button 212, it could be eliminated in an example where there is only one bonus available.

Figure 2G:
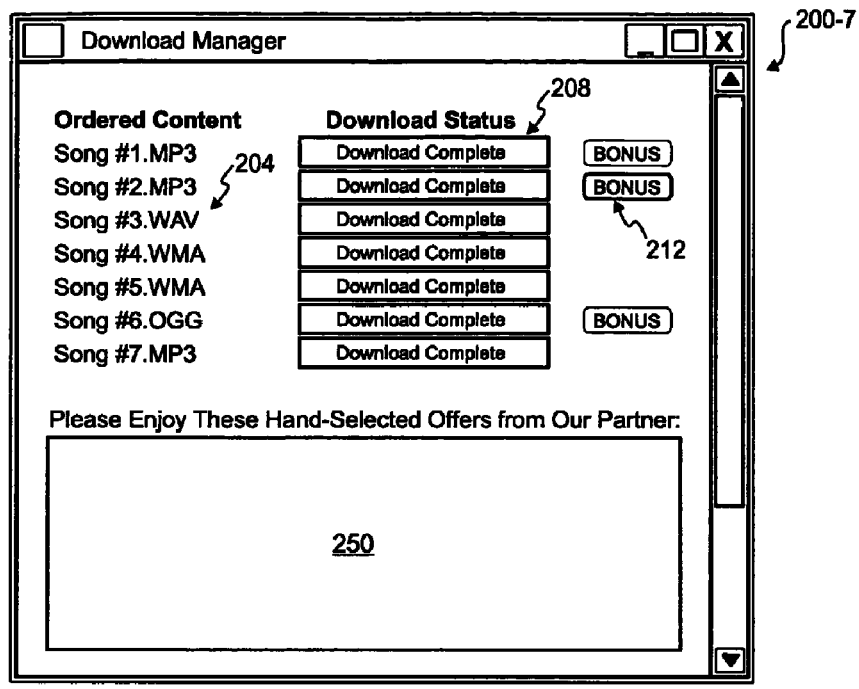

Referring next to FIG. 2G, a screen shot of yet another embodiment of a download status window 200-7 is shown. In this embodiment, a frame 250 is provided for the bonus on a particular content file 204. The frame 252 is populated with information from the content promoter 120 or some other third party. Other content files 204 on the list could have additional content provided from the content provider 108.

Figure 2H:
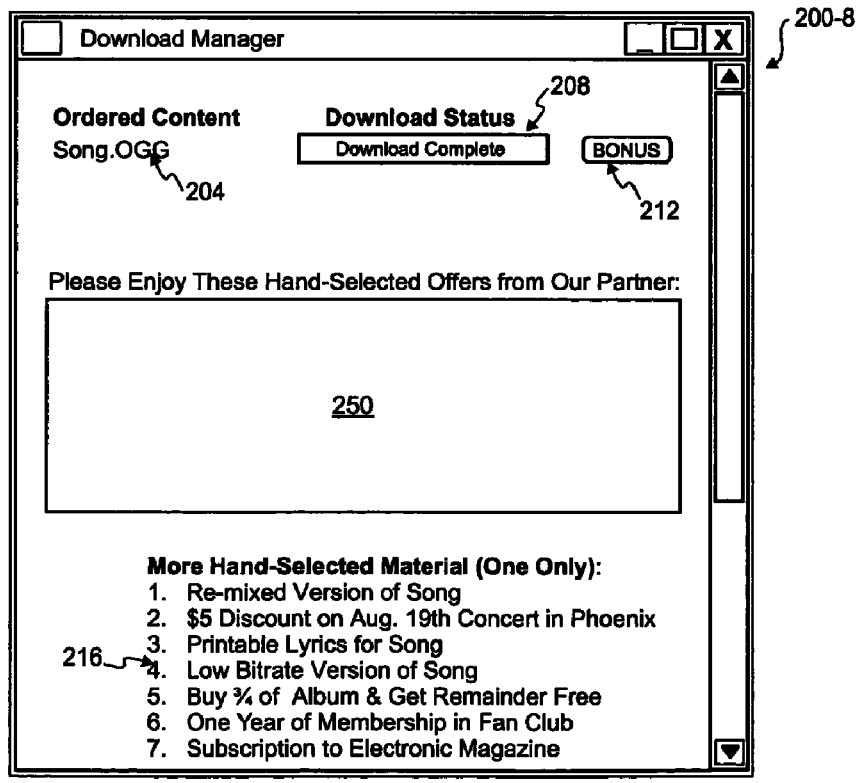

With reference to FIG. 2H, a screen shot of still another embodiment of a download status window 200-8 is shown. In this embodiment, part of the additional content is in a frame 250 populated by a third party, but there is also a list of bonus items 216. The list of bonus items 216 could come from the content provider 108 and/or the content promoter 120.

Figure 3A:
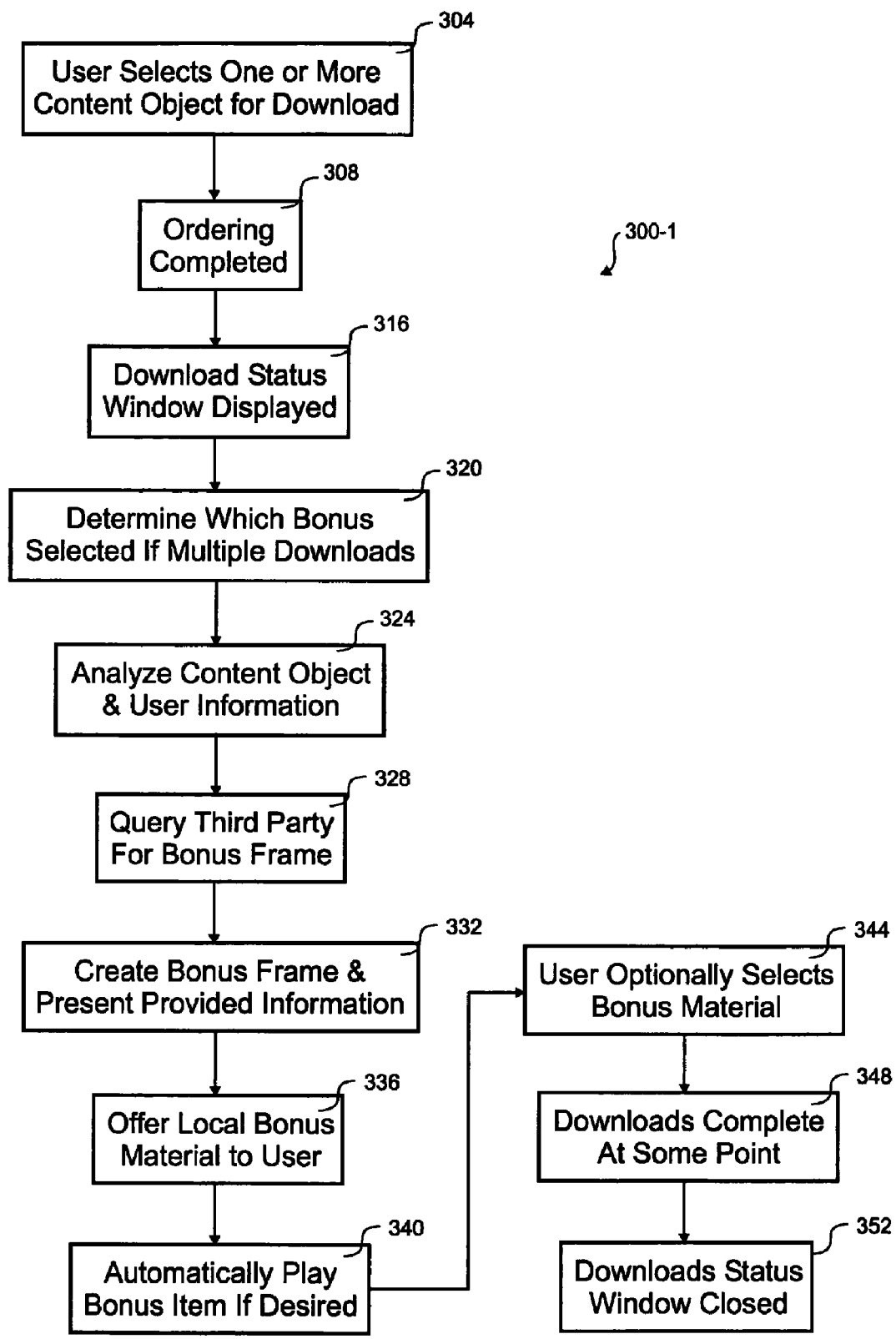
FIGS. 3A, 3B, 3C, and 3D are flow diagrams of embodiments of a process for downloading content in a rich environment.

Referring next to FIG. 3A, a flow diagram of an embodiment of a process 300-1 for downloading content in a rich environment is shown. The depicted portion of the process 300-1 begins in step 304 where the user interacts with the content site 116 to select one or more content objects for download or streaming. The ordering process is completed in step 308, which may involve payment for the content objects. In step 316, the browser or a download manager program display the download status window 200.

It is determined which of multiple bonuses should be currently displayed in step 320. The recipient could select a bonus button 212, the bonus of the currently downloading content object could be selected, or the bonuses could be offered in a sequential or random rotation during the download process. The bonuses could be available before or after download begins in various embodiments. Some embodiments allow access of the additional content after downloading completes, while others do not. In one embodiment, the additional content is available until the download status window 200 is closed.

Once the content provider knows which content object's bonus should be displayed, the content object and user information database 144 are analyzed. This analysis is split between the content provider 108 and the content promoter 120 in this embodiment. In step 328, the content promoter 120 or other third party is given the content object and user information and queried for a bonus frame to fill. The bonus frame 250 is displayed in the download status window 200 and populated with information from the content promoter 120 in step 332.

The content provider 108 uses the content object and user information database 144 to determine if anything in the local additional content database 140 should be offered in addition to the framed additional content. In step 336, the additional bonus material is also presented to the recipient 112. The content provider 108 and/or content promoter 120 who include a streaming video or audio message can automatically play it or not in step 340.

The recipient 112 can interact with the download status window 200 to select bonus material in step 344, but there is no requirement that the recipient 112 do so. In step 348, the download of the content objects and any selected additional content completes 348. The download status window can automatically close in step 352 or require manual closure by the recipient 112.

Figure 3B:
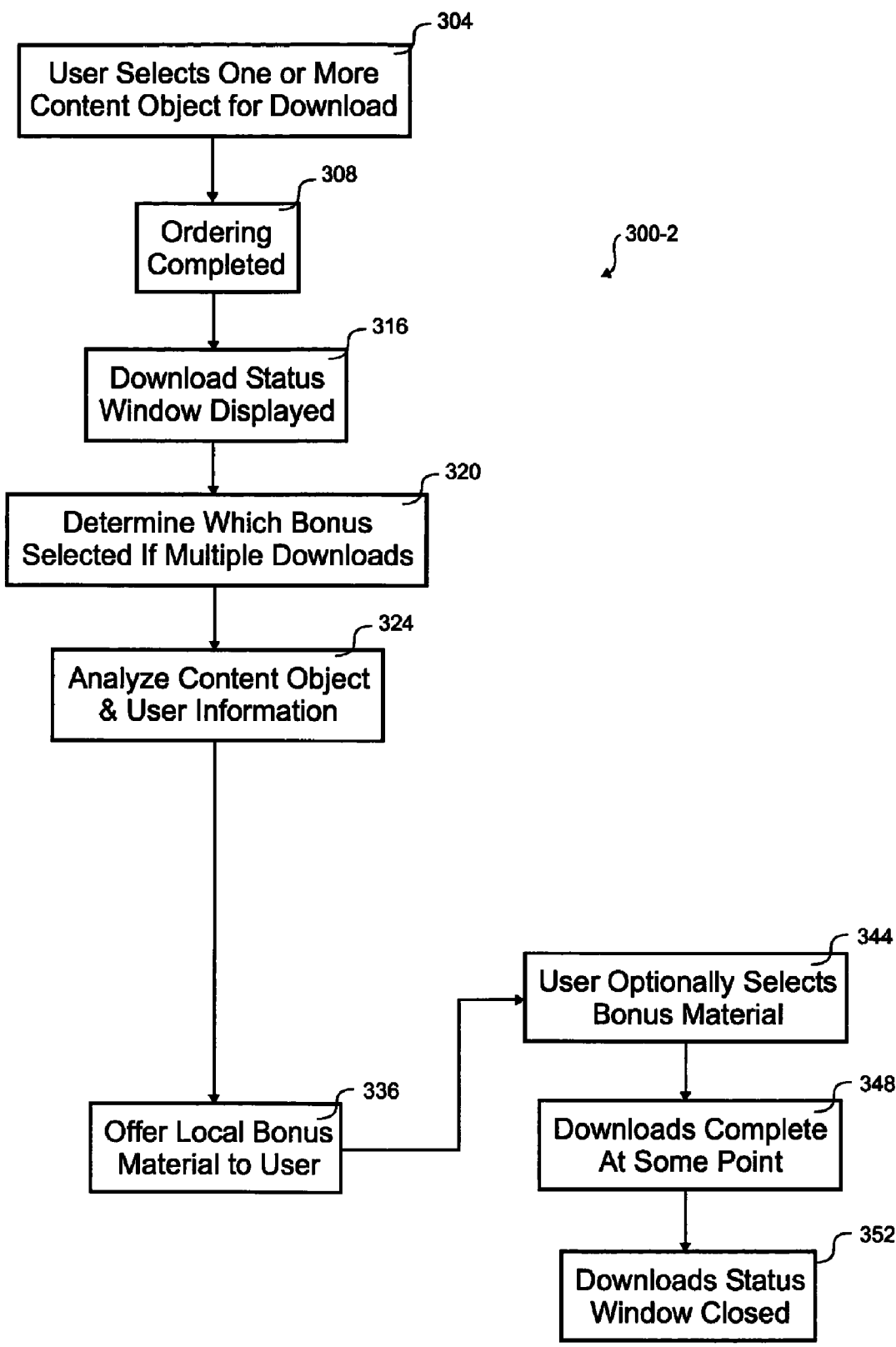

With reference to FIG. 3B, a flow diagram of another embodiment of a process 300-2 for downloading content in a rich environment is shown. This embodiment gathers all additional content locally and does not rely upon a content promoter 120 or other third party. Also, this embodiment does not automatically play additional content. This embodiment differs from that of FIG. 3A in that processing goes from step 324 to 336 without including steps 328 or 332. Additionally, step 340 is also skipped.

Figure 3C:
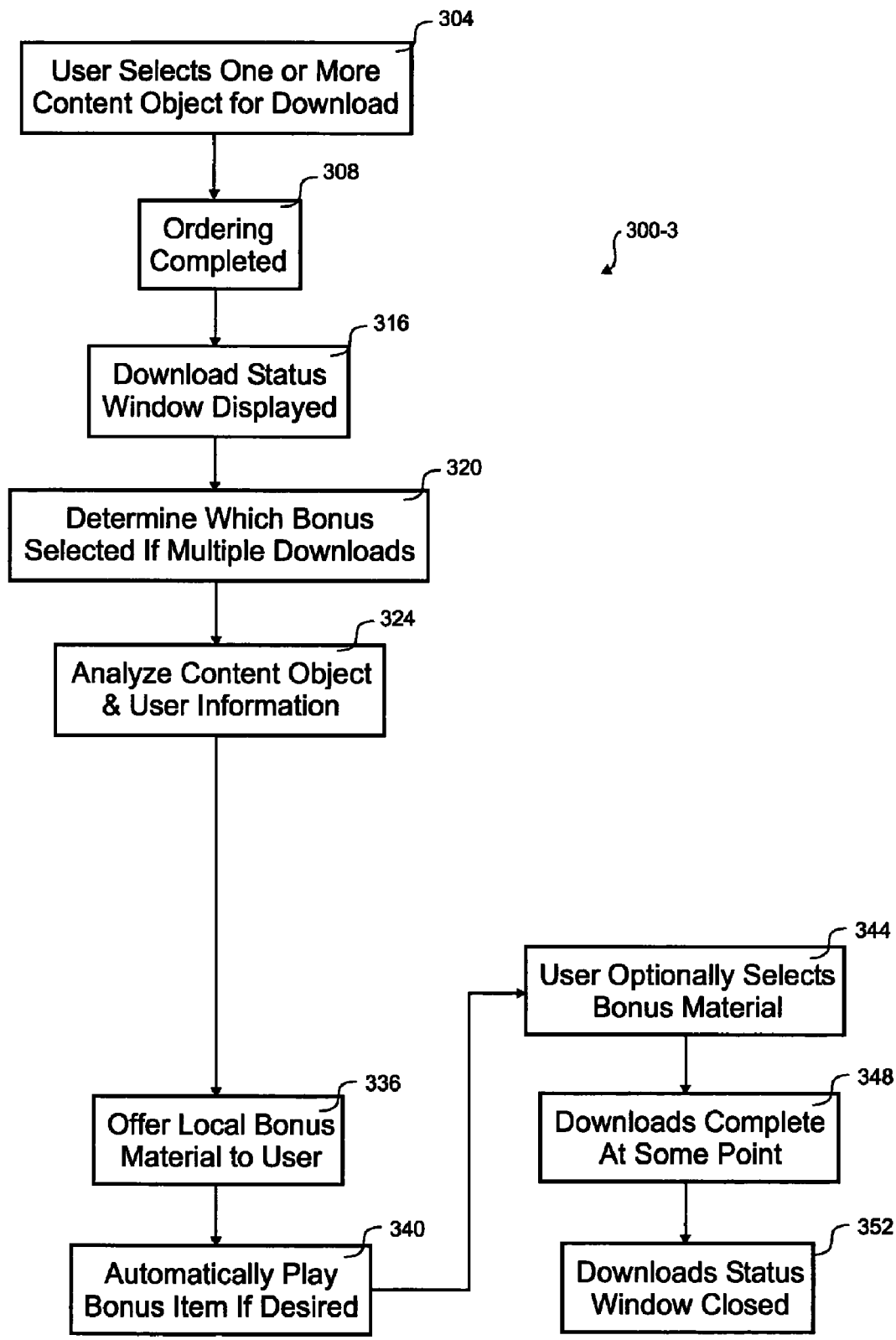

Referring next to FIG. 3C, a flow diagram of yet embodiment of a process 300-3 for downloading content in a rich environment is shown. This embodiment allows automatic playing of a bonus item if that is desired. The recipient 112 many disable this feature. This embodiment differs from that of FIG. 3A in that processing goes from step 324 to 336 without including steps 328 or 332.

Figure 3D:
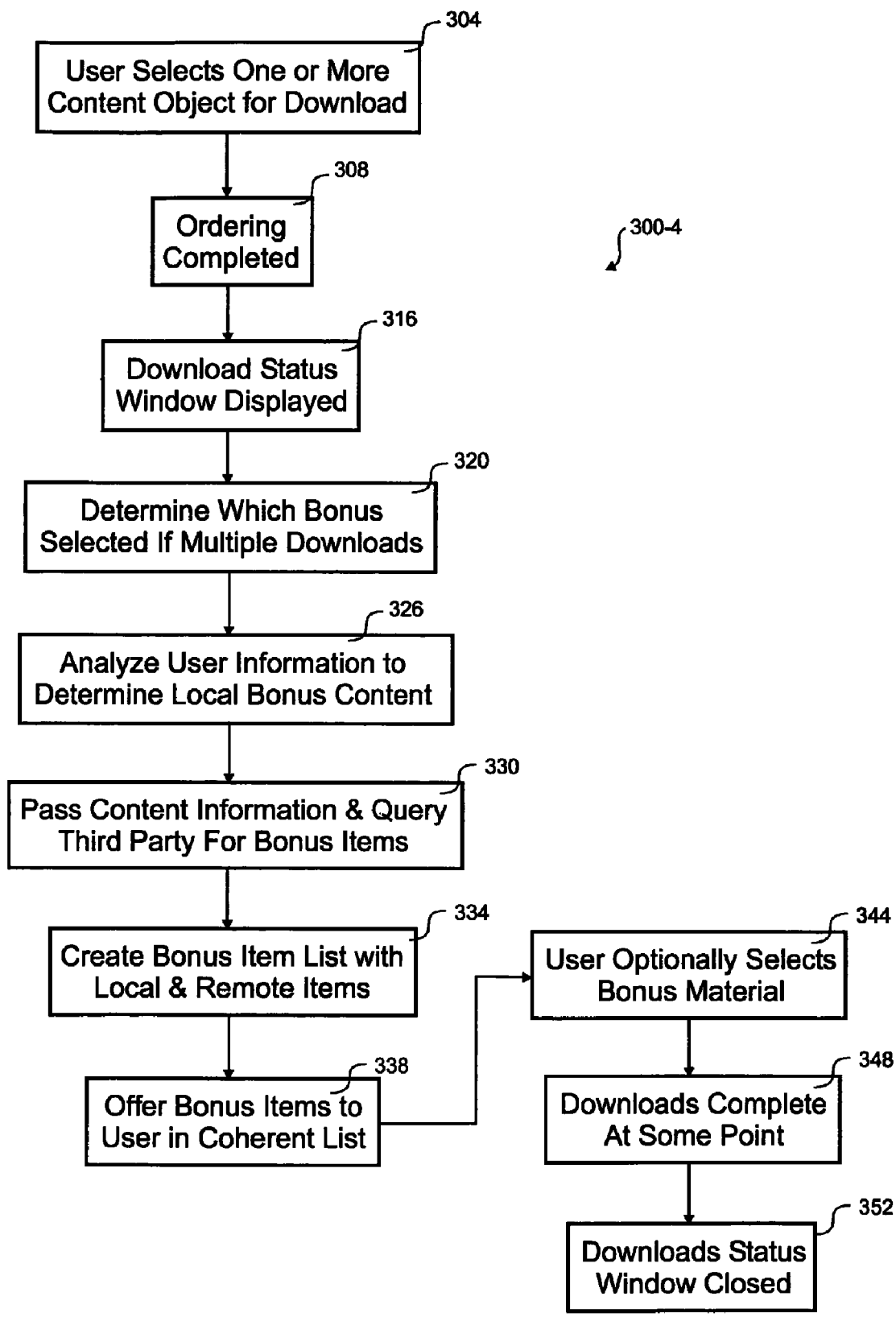

With reference to FIG. 3D, a flow diagram of still another embodiment of a process 300-4 for downloading content in a rich environment is shown. In this embodiment, processing is as in the embodiment of FIG. 3B until step 320 is completed. From step 320, new step 326 analyzes the local additional content database for bonus material. The content promoter 120 does not receive a frame, but is queried for items in step 330. A list with both locally supplied additional content and additional content from a third party is created in step 334 and offered to the recipient 112 in step 338. Processing continues from step 338 to step 344 without having a step 340 as in FIG. 3B.

While the principles of the invention have been described above in connection with specific apparatuses and methods, it is to be clearly understood that this description is made only by way of example and not as limitation on the scope of the invention.

What is claimed is:

1. A content download system for downloading a content file and additional content using a window of a graphical user interface; the content download system comprising:
   a content site that presents the window, wherein the window:
       displays the download progress of the content file,
       displays user interface controls to allow selection of the additional content for playing or downloading, wherein the additional content is bonus material and the additional content has not been chosen to be downloaded or played by a recipient of the content file prior to the user interface controls being displayed,
       automatically plays at least a first portion of the additional content, in streamed fashion, while the content file is downloaded, and
       allows selection of a second portion of the additional content, via the user interface controls for playing or downloading, the second portion being different than the first portion;
   a content provider that serves as an origin server computer for the content file; and
   a third party download-service server computer that receives information on the content file, wherein:
       the third party download-service server dynamically selects the additional content from contents in an additional-content database, the dynamic selection being prior to the automatic playing of the at least a first portion of the additional content;
       the third party download-service server dynamically selects a third portion of the additional content from a plurality of contents after receiving the selection of the second portion of the additional content, and
       the third party download-service server computer provides the additional content, and
       the additional content is automatically correlated to the content file.

2. The content download system for downloading the content file and additional content using the window as recited in claim 1, wherein the first portion of the additional content is streaming video or audio that is related to the content file.

3. The content download system for downloading the content file and additional content using the window as recited in claim 1, wherein the origin server computer is a cache or mirror of the content provider.

4. The content download system for downloading the content file and additional content using the window as recited in claim 1, wherein a fourth portion of the additional content begins playing in the window automatically after the first portion has finished playing.

5. The content download system for downloading the content file and additional content using the window as recited in claim 1, wherein the second portion of the additional content is a content file that can be downloaded.

6. The content download system for downloading the content file and additional content using the window as recited in claim 1, wherein the window is separate from another window used by the recipient to select the content file.

7. The content download system for downloading the content file and additional content using the window as recited in claim 1, wherein the window is produced by a download manager application separate from a web browser.

8. The content download system for downloading the content file and additional content using the window as recited in claim 1, wherein the third party server computer additionally receives demographic information about the user, wherein the additional content selected by the third party server computer is based, at least in part, on the demographic information.

9. The content download system for downloading the content file and additional content using the window as recited in claim 8, wherein the demographic information includes information comprising at least one of customer identity, including name, age, address, and phone number; prior purchases of the customer; fan club memberships; and interest in a particular artist, genre, studio or label.

10. The content download system for downloading the content file and additional content using the window as recited in claim 1, wherein the additional content is dynamically selected based on at least one of customer identity, including name, age, address, and phone number; prior purchases of the customer; fan club memberships; and interest in a particular artist, genre, studio or label.

11. A method for downloading a content file and receiving additional content with a window of a graphical user interface, the method comprising:
   receiving selection information that indicates the content file;
   downloading the content file with the window, wherein download status information is provided with the window;
   dynamically selecting by a server, after receiving the selection information, the additional content to present;
   displaying user interface controls to allow selection of the additional content for playing or downloading, wherein the additional content is bonus material and the additional content has not been chosen to be downloaded or played by a recipient of the content file prior to the displaying;
   automatically playing at least a first portion of the additional content, in streamed fashion, while the content file is downloading, wherein:
       the additional content is associated with the content file and/or customer in some way,
       the additional content is sent from an address different from the content file,
       the additional content is bonus material, and the first portion of the additional content has not been manually chosen by the customer for playing or downloading;

allowing selection of a second portion of the additional content from the window, via the user interface controls for playing or downloading, while the content file is downloading, the second portion being different than the first portion; and selecting a third portion of the additional content after selection of the second portion.

12. The method for downloading the content file and receiving additional content with the window as recited in claim 11, further comprising the customer acquiring rights to the content file.

13. The method for downloading the content file and receiving additional content with the window as recited in claim 11, further comprising automatically opening the window separate from another window used by a recipient that selected the content file.

14. The method for downloading the content file and receiving additional content with the window as recited in claim 11, further comprising displaying a progress indicator that indicates download progress for the content file.

15. The method for downloading the content file and receiving additional content with the window as recited in claim 11, wherein the downloading comprises downloading a plurality of content files.

16. The method for downloading the content file and receiving additional content with the window as recited in claim 11, wherein the additional content is provided by a third party separate from a content provider, which formulates the window.

17. The method for downloading the content file and receiving additional content with the window as recited in claim 11, further comprising automatically playing a fourth portion of the additional content during download of the content object after the first portion has finished playing.

18. A computer-readable medium having computer-executable instructions for performing the computer-implementable method for downloading the content file and receiving additional content with the window of claim 11.

19. A hardware computer system adapted to perform the computer-implementable method for downloading the content file and receiving additional content with the window of claim 11.

20. The method for downloading the content file and receiving additional content with the window as recited in claim 11, wherein the additional content is dynamically selected based on at least one of customer identity, including name, age, address, and phone number; prior purchases of the customer; fan club memberships; and interest in a particular artist, genre, studio or label.

21. A method for downloading a content file and receiving additional content with a window of a graphical user interface, the method comprising:

receiving selection information that indicates a customer is acquiring rights to the content file;

downloading the content file with the window, wherein download status information is provided with the window;

dynamically selecting by a server the additional content to present as a bonus upon receiving the information indicating the customer is acquiring rights to the content file;

displaying user interface controls to allow selection of the additional content for playing or downloading, wherein the additional content has not been chosen to be downloaded or played by a recipient of the content file prior to the displaying;

automatically playing at least a first portion of the additional content, in streamed fashion, while the content file is downloading, wherein:

the additional content was not bargained for as part of the acquired rights indicated by the selection information, the additional content is associated with the content file and/or customer in some way, and the first portion of the additional content is video or audio; and allowing selection of a second portion of the additional content, via the user interface controls for playing or downloading, while the content file is downloading, the second portion being different than the first portion.

22. The method for downloading the content file and receiving additional content with the window as recited in claim 21, wherein the first portion of the additional content is played in the window.

23. The method for downloading the content file and receiving additional content with the window as recited in claim 21, wherein the first portion of the additional content is played in another window.

24. The method for downloading the content file and receiving additional content with the window as recited in claim 21, further comprising automatically playing the additional content during download of the content object.

25. A computer-readable medium having computer-executable instructions for performing the computer-implementable method for downloading the content file and receiving additional content with the window of claim 21.

26. A hardware computer system adapted to perform the computer-implementable method for downloading the content file and receiving additional content with the window of claim 21.

* * * * *